US007011554B2

(12) United States Patent
Taniguchi et al.

(10) Patent No.: US 7,011,554 B2
(45) Date of Patent: Mar. 14, 2006

(54) GROUNDING MECHANISM FOR ELECTRIC MOTOR WITH ENCODER

(75) Inventors: Mitsuyuki Taniguchi, Gotenba (JP); Hirofumi Kikuchi, Yamanashi (JP); Hiromichi Horiuchi, Fujiyoshida (JP)

(73) Assignee: FANUC LTD, Yamanashi (JP)

( * ) Notice: Subject to any disclaimer, the term of this patent is extended or adjusted under 35 U.S.C. 154(b) by 0 days.

(21) Appl. No.: 10/773,158

(22) Filed: Feb. 9, 2004

(65) Prior Publication Data

US 2004/0157502 A1 Aug. 12, 2004

(30) Foreign Application Priority Data

Feb. 10, 2003 (JP) ............................ 2003-032877

(51) Int. Cl.
*H01R 4/28* (2006.01)

(52) U.S. Cl. .......................... 439/760; 439/95; 439/98

(58) Field of Classification Search ................ 439/760, 439/95, 97, 98, 801
See application file for complete search history.

(56) References Cited

U.S. PATENT DOCUMENTS

| | | | | |
|---|---|---|---|---|
| 4,570,338 A * | 2/1986 | Ignatowicz | .................. | 29/845 |
| 4,650,274 A * | 3/1987 | Schmid | ...................... | 439/801 |
| 4,927,367 A * | 5/1990 | Salvagno | ..................... | 439/92 |
| 5,429,512 A * | 7/1995 | Sawamura | ................... | 439/97 |
| 5,458,512 A * | 10/1995 | Takano et al. | .............. | 439/801 |
| 5,608,611 A * | 3/1997 | Szudarek et al. | ........... | 361/753 |
| 6,319,018 B1 * | 11/2001 | Daoud | ......................... | 439/65 |
| 6,611,429 B1 * | 8/2003 | Kline et al. | ................. | 361/704 |
| 2002/0155738 A1 * | 10/2002 | Ohsawa et al. | ............... | 439/98 |

FOREIGN PATENT DOCUMENTS

| | | |
|---|---|---|
| CN | 1197311 A | 10/1998 |
| JP | 07-255148 | 10/1995 |
| JP | 2002-101605 | 4/2002 |
| JP | 2002-354756 | 12/2002 |

OTHER PUBLICATIONS

Japan Patent Office, Abstract of JP7255148.
The Patent Office of the People's Republic of China, Notification of the First Office Action, Oct. 14, 2005.

* cited by examiner

*Primary Examiner*—Hae Moon Hyeon
(74) *Attorney, Agent, or Firm*—Staas & Halsey LLP

(57) ABSTRACT

An assembly of electric motor with encoder, including an electric motor having a motor housing, and an encoder for detecting the rotation angle of the output shaft of the electric motor. The encoder includes a frame member attached to the motor housing in a conductive manner, a circuit board supported on the frame member and a detection circuit provided in the circuit board. The assembly of electric motor with encoder further includes an output signal cable connected to the circuit board of the encoder and including a signal wire and a shield member, and a grounding mechanism electrically connecting the shield member of the output signal cable to the motor housing for grounding purposes. The grounding mechanism includes a conductor patterned on the circuit board, a first connecting structure mutually connecting the conductor to the shield member, and a second connecting structure mutually connecting the conductor to the frame member. The second connecting structure includes a through-hole plating provided in the circuit board to be connected to the conductor, and a fastening element inserted into a through hole having the through-hole plating and securing the circuit board onto the frame member. When the fastening member is fastened, the through-hole plating comes into conductive contact with the frame member.

11 Claims, 8 Drawing Sheets

GROUNDING MECHANISM FOR ELECTRIC MOTOR WITH ENCODER

BACKGROUND OF THE INVENTION

1. Field of the Invention

The present invention relates generally to an electric motor and, more particularly, to an assembly of electric motor with encoder, which includes a shield grounding arrangement provided for a cable having a signal wire for outputting the detecting signal of the encoder and a shield member for shielding the signal wire.

2. Description of the Related Art

In an electric motor, an encoder provided for detecting positional data, such as the rotation angle of a motor shaft, has recently been developed so as to have detectability with higher precision and resolution, and accordingly, it is necessary to reduce the influence of noise on the output signal of the encoder sufficiently. Conventionally, for the purpose of reducing the influence of noise, a cable having therein a signal wire for outputting the detecting signal of the encoder (hereinafter referred to as an output signal cable) is provided with a shield member having a linear, network or film shape. The shield member provided in the output signal cable is generally electrically connected to the housing of the electric motor for grounding purposes.

Japanese Unexamined Patent Publication (Kokai) No. 2002-354756 (JP2002-354756A) discloses an electric motor with encoder, wherein the output signal cable of the encoder is connected to a board connector on a circuit board of the encoder through a cable connector having a grounding wire. A shield member contained in the output signal cable is connected to the housing of the electric motor, through the mutual-connecting terminals of the cable and board connectors, a patterned conductor on the circuit board and the grounding wire of the cable connector. The grounding wire is secured at the distal end thereof to the housing of the electric motor by a screw, whereby the shield member is electrically grounded.

Japanese Unexamined Patent Publication (Kokai) No. 2002-101605 (JP2002-101605A) discloses an electric motor with encoder, wherein the output signal cable of the encoder is mounted on the housing of the electric motor through an electrical-conductive bush. A shield member contained in the output signal cable is partially exposed by removing a cable sheath, and is electrically connected to the motor housing for grounding purposes, by fixing the conductive bush to the exposed portion of the shield member as well as to the motor housing.

Japanese Unexamined Patent Publication (Kokai) No. 10-239101 (JP10-239101A) discloses an electric motor with encoder, wherein a shield member provided in the lead wire of the electric motor is connected to an encoder cover. The shield member of the lead wire is electrically connected to the encoder cover for grounding purposes, by fixing the distal end of a shielding wire extending from the lead wire to the encoder cover by a screw.

SUMMARY OF THE INVENTION

It is an object of the present invention to provide an improved shield grounding arrangement for an output signal cable in an electric motor with encoder, so as to facilitate a connecting operation of the output signal cable and to reduce operation costs.

To accomplish the above object, the present invention provides an assembly of electric motor with encoder, comprising a motor housing; an encoder including a frame member attached to the motor housing in a conductive manner, a circuit board supported on the frame member and a detection circuit provided in the circuit board; an output signal cable connected to the circuit board of the encoder and including a signal wire and a shield member; and a grounding mechanism electrically connecting the shield member of the output signal cable to the motor housing for grounding purposes; wherein the grounding mechanism includes a conductor patterned on the circuit board, a first connecting structure mutually connecting the conductor with the shield member, and a second connecting structure mutually connecting the conductor with the frame member.

In the above assembly of electric motor with encoder, the first connecting structure may comprise a first connector connected to the detection circuit and the conductor of the circuit board, and a second connector connected to the signal wire and the shield member of the output signal cable, the first connector and the second connector being able to be coupled with each other.

In this arrangement, the first connector may comprise a board connector mounted on the circuit board.

Also, the first connector may include a first conductive shell connected to the conductor, and the second connector may include a second conductive shell connected to the shield member, the second conductive shell being able to be coupled with the first conductive shell.

In this arrangement, the first connector may comprise an outer connector attached to an encoder cover enclosing the circuit board.

Further, the second connecting structure may comprise a through-hole plating provided in the circuit board to be connected with the conductor, the through-hole plating coming into conductive contact with the frame member.

In this arrangement, the second connecting structure may further comprise a fastening element inserted into a through hole having the through-hole plating and securing the circuit board onto the frame member.

Alternatively, the second connecting structure may comprise a land provided on the circuit board to be connected to the conductor and a connecting element electrically connecting the land to the frame member.

In this arrangement, the connecting element may comprise a conductive fastening element securing the circuit board onto the frame member while coming into conductive contact with the land.

Also, the second connecting structure may comprise a conductive fastening element securing the circuit board onto the frame member while conducting with the conductor.

Alternatively, the second connecting structure may comprise a fastening element securing the circuit board onto the frame member in a condition where the conductor is brought into conductive contact with the frame member.

BRIEF DESCRIPTION OF THE DRAWINGS

The above and other objects, features and advantages of the present invention will become more apparent from the following description of preferred embodiments in connection with the accompanying drawings, of which.

DETAILED DESCRIPTION

Figure 1:
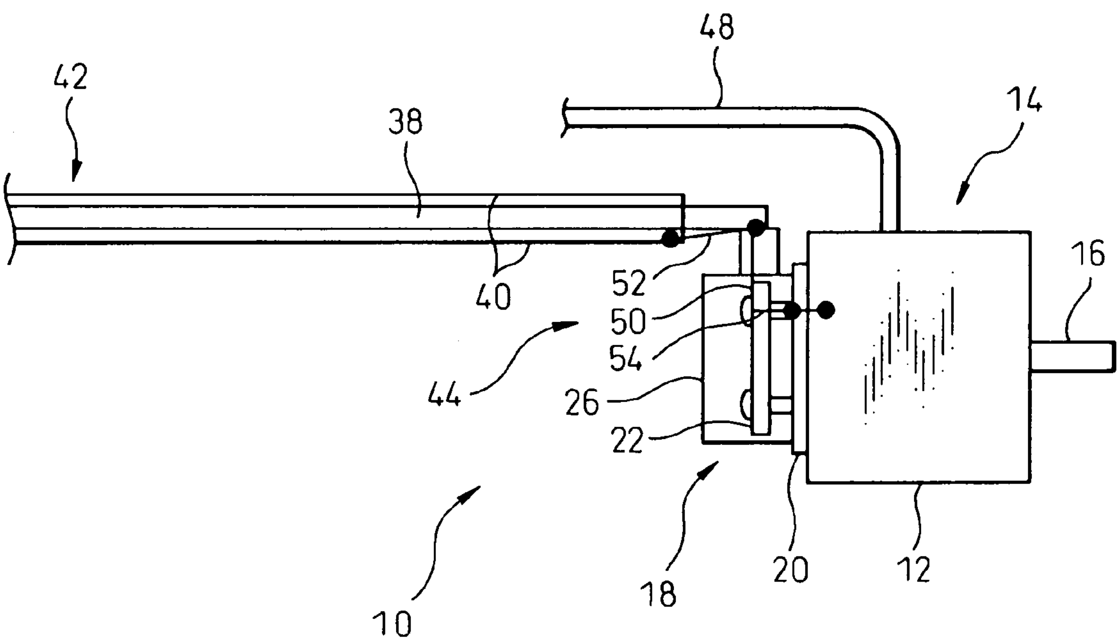
FIG. 1 is an illustration schematically showing an embodiment of an assembly of electric motor with encoder, according to the present invention.

The embodiments of the present invention are described below in detail, with reference to the accompanying drawings. In the drawings, the same or similar components are denoted by common reference numerals.

Referring to the drawings, FIG. 1 schematically shows an assembly 10 of electric motor with encoder, according to one embodiment of the present invention. The assembly 10 of electric motor with encoder includes an electric motor 14 having a motor housing 12, and an encoder 18 for detecting the rotation angle of an output shaft 16 of the electric motor 14. The encoder 18 includes a frame member 20 attached to the motor housing 12 in an electrically conductive manner, a circuit board 22 supported on the frame member 20 and a detection circuit 24 (FIG. 2) provided in the circuit board 22. The encoder 18 is disposed at the rear end region of the motor housing 12 with the circuit board 22 being covered by an encoder cover 26.

Figure 2:
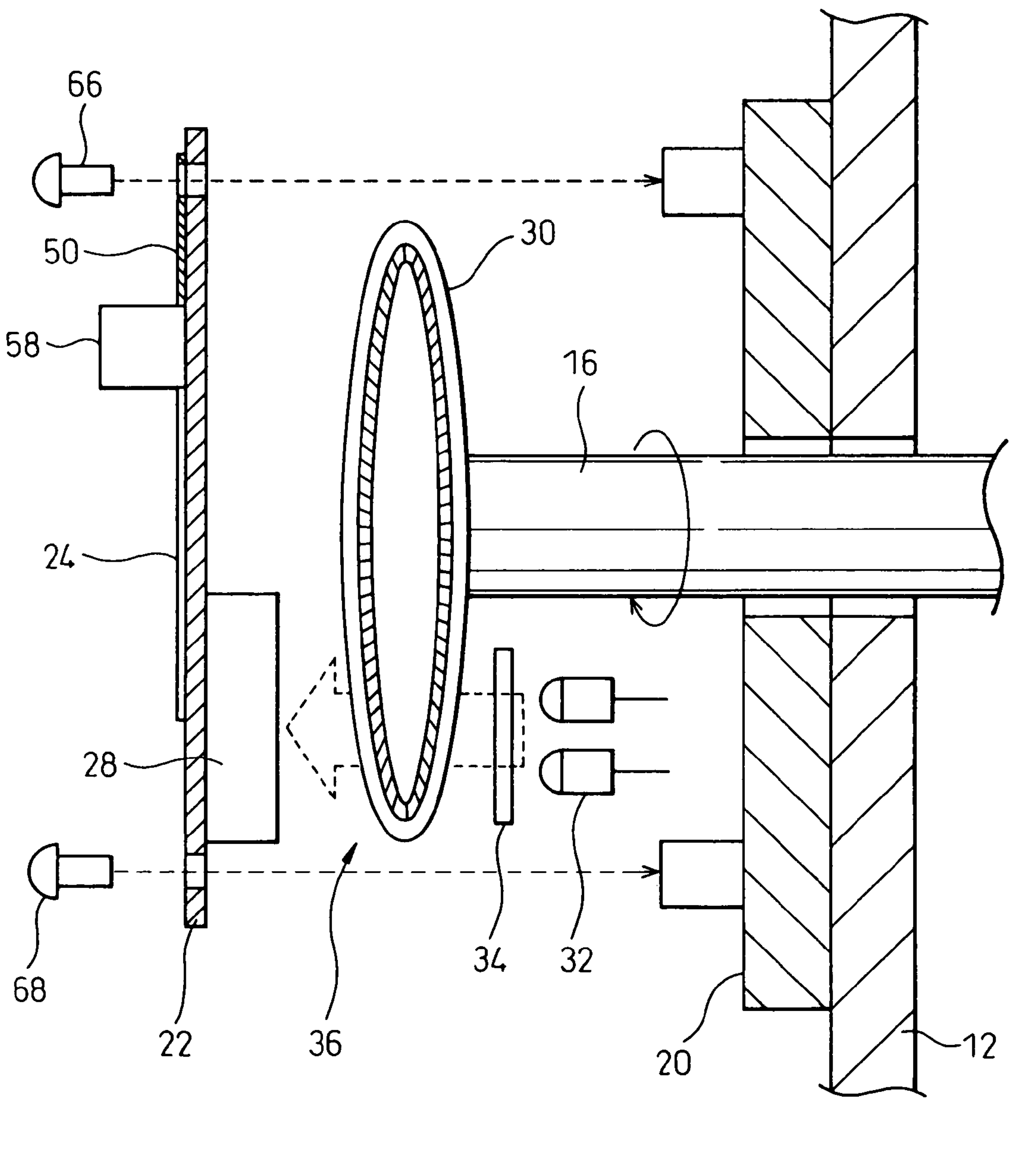
FIG. 2 is an illustration typically showing a detecting section in the assembly of electric motor with encoder as shown in FIG. 1.

As typically shown in FIG. 2, the detection circuit 24 of the encoder 18 includes a light receiving element 28, such as a photodiode, and cooperates with a slit disc 30, attached to the output shaft 16 of the electric motor 14, and a light emitting element 32 and a fixed slit plate 34, arranged opposite to the light receiving element 28 with the disc 30 being disposed therebetween, so as to constitute an optical detecting section 36 of the encoder 18. It should be noted that the present invention does not restrict the constitution of the detecting section of the encoder, but may adopt detecting sections having various constitutions, such as a magnetic or the other optical type. Also, the present invention may be applied not only to a rotary motor with a rotary encoder as the illustrated embodiment, but also to a linear motor with a linear encoder incorporated therewith.

Referring again to FIG. 1, the assembly 10 of electric motor with encoder further includes an output signal cable 42 connected to the circuit board 22 of the encoder 18 and including a signal wire 38 and a shield member 40, and a grounding mechanism 44 electrically connecting the shield member 40 of the output signal cable 42 to the motor housing 12 for grounding purposes. The output signal cable 42 serves to transmit a detecting signal output from the detection circuit 24 of the encoder 18 to an outside control circuit (not shown) through the signal wire 38. The shield member 40, made of metal and having a linear, network or film shape, is disposed to surround the signal wire 38 inside a sheath 46 (see FIGS. 8A and 8B), and serves to reduce the influence of noise on the detecting signal during transmission. In the assembly 10 of electric motor with encoder, a power line 48 is used for an electric power supply to the electric motor 14.

Figure 3A:
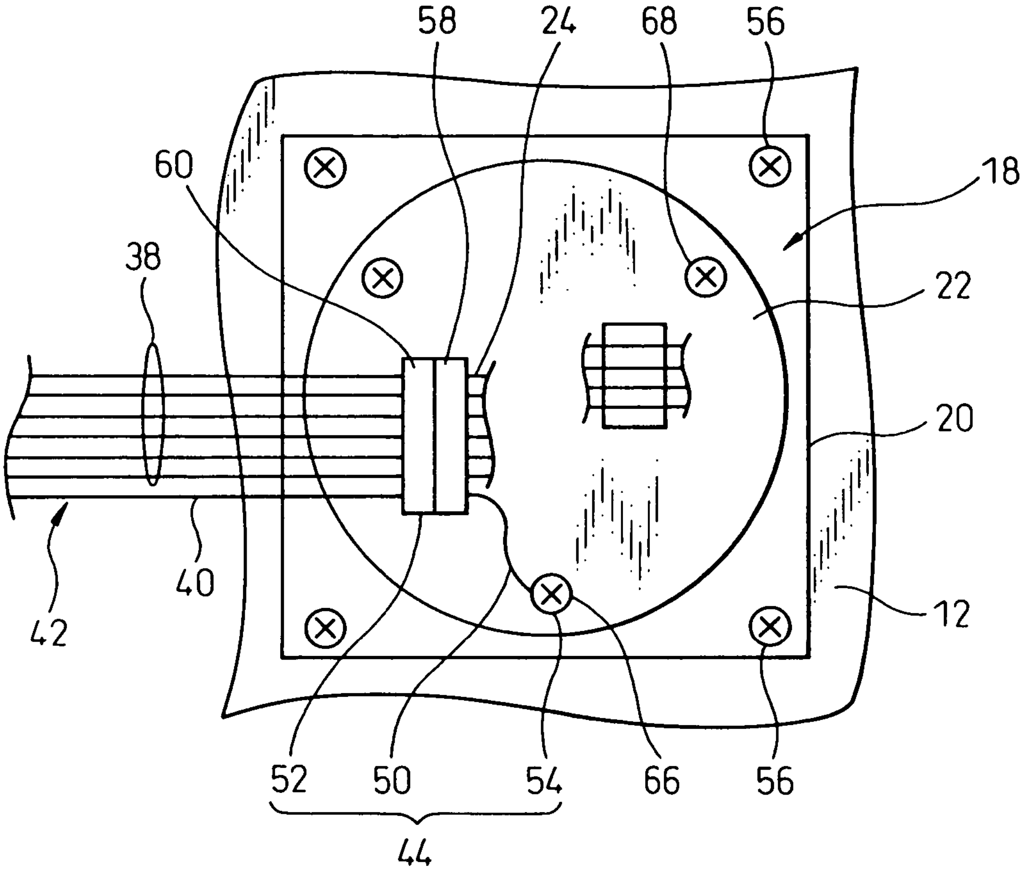
FIG. 3A is a schematic plan view showing a grounding mechanism of the assembly of electric motor with encoder as shown in FIG. 1.
Figure 3B:
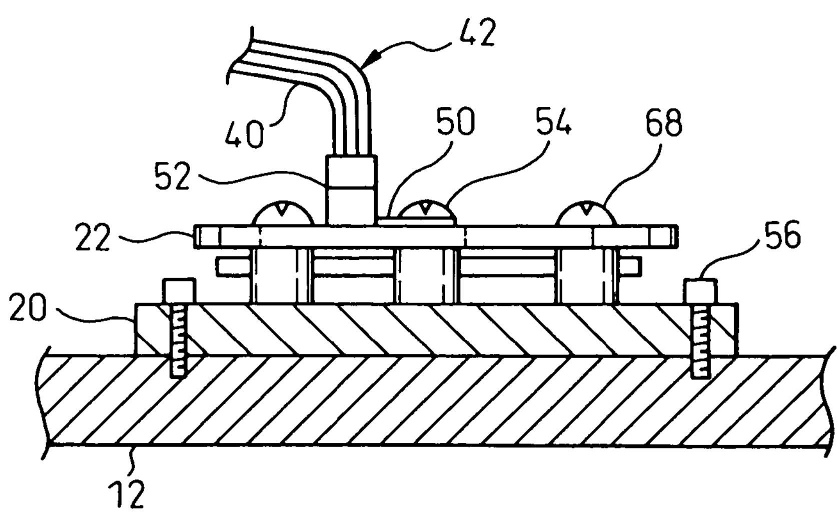
FIG. 3B is a schematic sectional view showing the grounding mechanism as shown in FIG. 3A.

As shown in FIGS. 3A and 3B, the grounding mechanism 44 includes a conductor 50 patterned on the circuit board 22, a first connecting structure 52 mutually connecting the conductor 50 to the shield member 40, and a second connecting structure 54 mutually connecting the conductor 50 to the frame member 20. The grounding mechanism 44 serves to maintain the shield member 40 of the output signal cable 42 and the motor housing 12 at a common potential (or a ground potential). To this end, the motor housing 12 and the frame member 20 of the encoder 18 are made of good electrically conductive materials in at least the respective mutual-joint regions thereof. Further, the frame member 20, also called an encoder flange (or a flange base), is fixedly joined to the motor housing 12 by using a plurality of fastening elements 56, such as metal screws, so as to ensure the electrical conducting condition (or the ground potential) of the motor housing 12 and the frame member 20. In this respect, the motor housing 12 is grounded through an earth wire, etc. (not shown).

The conductor 50 of the grounding mechanism 44 is formed in a predetermined pattern on the surface of the circuit board 22 so as to extend between the first connecting structure 52 and the second connecting structure 54, by, e.g., a known manufacturing technology for printed circuit board wherein the wiring of the detection circuit 24 of the encoder 18 is patterned. The first connecting structure 52 includes a first connector 58 connected to the detection circuit 24 and the conductor 50 of the circuit board 22 and a second connector 60 connected to the signal wire 38 and the shield member 40 of the output signal cable 42, the first connector 58 and the second connector 60 being able to be coupled with each other. In the illustrated embodiment, the first connector 58 is a board connector mounted on the surface of the circuit board 22, and one terminal (not shown) in the first connector is connected to one end of the conductor 50. On the other hand, one terminal (not shown) in the second connector 60 as a cable connector is connected to the shield member 40. When the first and second connectors 58, 60 are properly coupled with each other, the terminal of the former connector, connected to the conductor 50, is connected to the terminal of the latter connector, connected to the shield member 40.

Figure 4A:
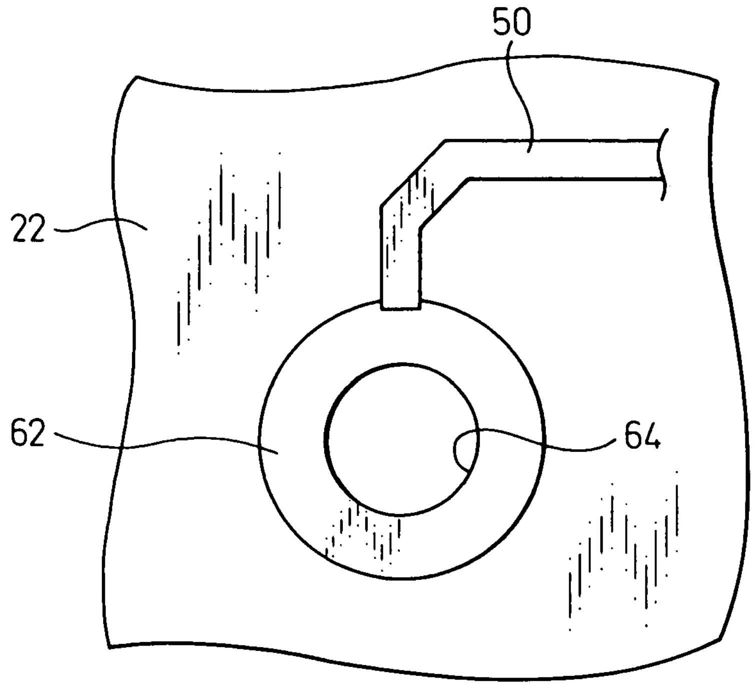
FIG. 4A is an enlarged plan view showing a second connecting structure of the grounding mechanism as shown in FIG. 3A.
Figure 4B:
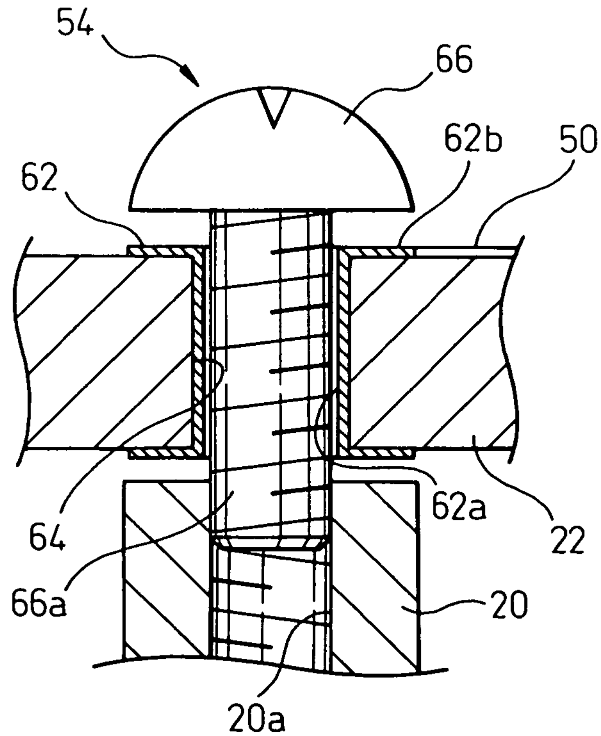
FIG. 4B is an enlarged sectional view showing the second connecting structure as shown in FIG. 4A.

As shown in FIGS. 4A and 4B, the second connecting structure 54 includes a through-hole plating 62 provided in the circuit board 22 to be connected with the conductor 50, and a fastening element 66 inserted into a through hole 64 having the through-hole plating 62. The through-hole plating 62 is provided integrally with a cylindrical portion 62*a* and a pair of land portions 62*b*, wherein the cylindrical portion 62*a* extends over the entire inner face of the through hole 64 penetrating between the opposite surfaces of the circuit board 22, while the land portions 62*b* extend on the opposite surfaces of the circuit board 22 along the peripheries of the opposite end openings of the through hole 64, one land portion 62*b* being connected to the conductor 50. The fastening element 66, formed as, e.g. a metal screw, has the same construction as a plurality of fastening elements 68 used for securing the circuit board 22 to the frame member 20.

Accordingly, when, for example, the fastening element 66 having an external thread 66*a* is inserted into the through hole 64 and is screwed into an internal thread 20*a* formed in the frame member 20, the circuit board 22 is secured to the frame member 20 and, simultaneously therewith, the through-hole plating 62 comes into electrical conductive contact with the frame member 20. Thus, the conductor 50 and the frame member 20 are electrically connected to each other through the through-hole plating 62. Consequently, the shield member 40 of the output signal cable 42, connected to the conductor 50 via the first connecting structure 52, is electrically connected to the frame member 20 of the encoder 18, connected to the conductor 50 via the second connecting structure 54. In this respect, the frame member 20 is attached to the motor housing 12 in a condition as for them to be electrically conductive with each other, as already described, and as a result of this, the shield member 40 is electrically connected to the motor housing 12 so as to be stably grounded.

It should be noted that, in the illustrated structure of the through-hole plating 62 having the pair of land portions 62*b*, the fastening element 66 made of an insulating material, such as a resin, may be used. On the other hand, if the fastening element 66 made of a good electrically conductive material, such as a metal, is used, the grounding performance of the second connecting structure 54 can be significantly enhanced. Also, if the through-hole plating 62 does not have the land portions 62*b*, or if a non-plated through hole is adopted, it is effective that a conductive fastening element 66 made of a good electrical conductive material is used so that, when the fastening element 66 is fastened to the frame member 20, the conductor 50 comes into electrical conductive contact, at the distal end thereof, with the fastening element 66.

As will be understood from the above, according to the grounding mechanism 44, it is possible to connect the shield member 40 with the conductor 50 at the same time as the signal wire 38 is connected with the detection circuit 24, during the step of connecting the output signal cable 42 to the circuit board 22 in the assembling process of the encoder 18. Also, it is possible to electrically connect the conductor 50 with the frame member 20 by using the fastening elements 66, 68 having common structures, during the step of securing the circuit board 22 to the frame member 20. Therefore, in the assembly 10 of electric motor with encoder, it is enabled for the electrical connection between the shield member 40 of the output signal cable 42 and the motor housing 12 of the electric motor 14 to be readily established, without requiring a complicated operation such as a connecting operation for which a connection wire for the exclusive use of grounding purposes is provided. Consequently, according to the assembly 10 of electric motor with encoder, it is possible to facilitate a connecting operation of the output signal cable 42 and to reduce the operation costs thereof, so as to effectively reduce the cost and number of steps of assembling and manufacturing the assembly 10. It should be noted that an advantage is also obtained, wherein a cable termination processing such as the tearing off of the sheath 46 of the output signal cable 42 to expose the shield member 40 is eliminated, so that the waterproof properties of a cable connecting section are improved.

Figure 5A:
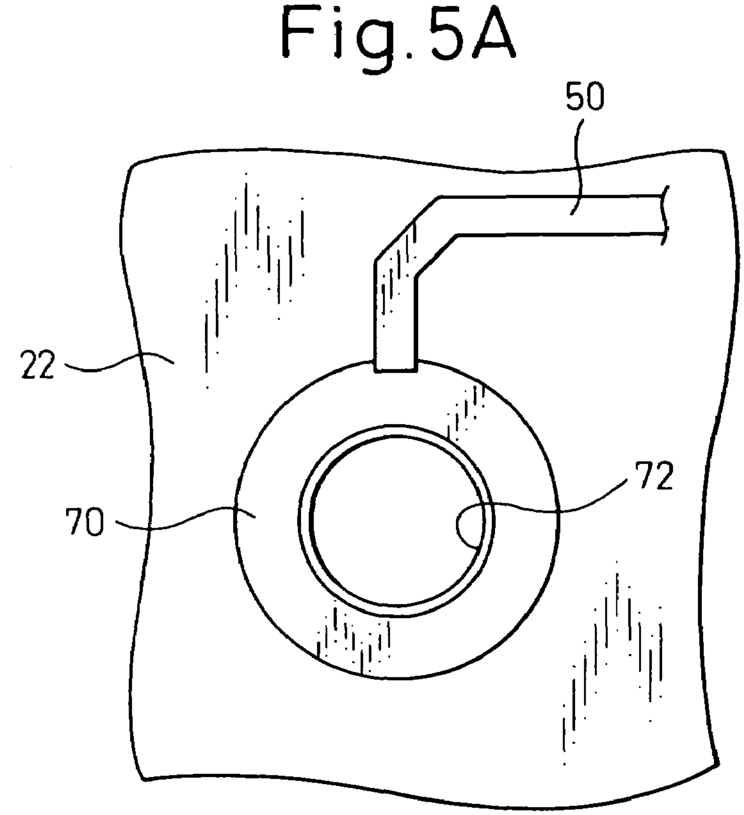
FIG. 5A is an enlarged plan view showing a second connecting structure of a grounding mechanism according to another embodiment.
Figure 5B:
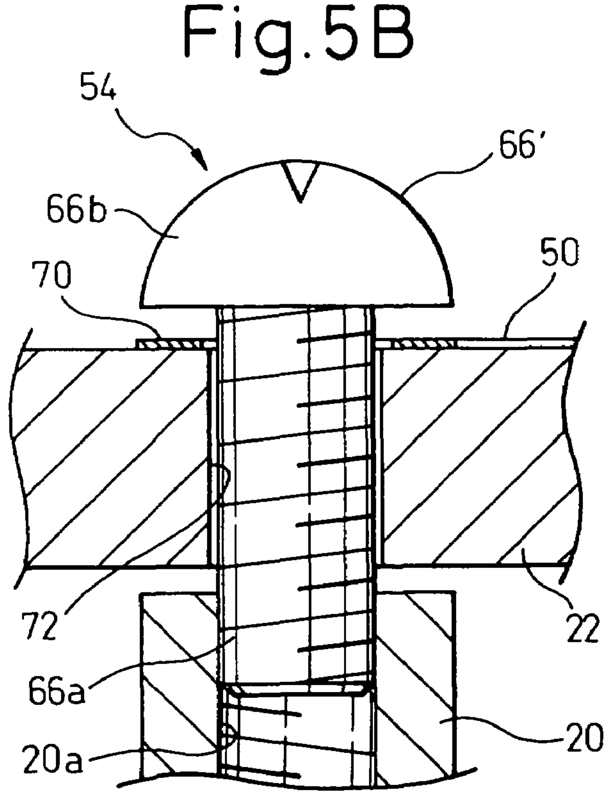
FIG. 5B is an enlarged sectional view showing the second connecting structure as shown in FIG. 5A.

Although, in the above embodiment, the through hole plating 62 shown in FIGS. 4A and 4B is used for the second connecting structure 54 for connecting the conductor 50 to the frame member 20, other means may be adopted therefor. For example, as shown in FIGS. 5A and 5B, the second connecting structure 54 may include a land 70 provided on the circuit board 22 to be connected with the conductor 50 and a connecting element 66' electrically connecting the land 70 to the frame member 20. In this embodiment, a non-plating through hole 72 is formed in the circuit board 22 to penetrate between the opposite surfaces thereof, and the land 70 extends annularly on one surface of the circuit board 22 along the periphery of one end opening of the non-plating through hole 72, the land 70 being patterned to be connected to the conductor 50. The connecting element 66' is formed as a conductive fastening element 66' made of a good electrically conductive material, which has the same construction as the fastening elements 68 (FIG. 3A).

Accordingly, when, for example, the conductive fastening element 66' having an external thread 66*a* is inserted into the non-plating through hole 72 and is screwed into an internal thread 20*a* formed in the frame member 20, the circuit board 22 is secured to the frame member 20 and, simultaneously therewith, the head 66*b* of the fastening element 66' comes into conductive contact with the land 70 so as to electrically connect the land 70 to the frame member 20. Thus, the conductor 50 and the frame member 20 are electrically connected to each other through the land 70 and the conductive fastening element 66'. Consequently, the shield member 40 of the output signal cable 42, connected to the conductor 50 via the first connecting structure 52, is electrically connected to the frame member 20 of the encoder 18, connected to the conductor 50 via the second connecting structure 54. In this respect, the frame member 20 is attached to the motor housing 12 in a condition as for them to be electrically conductive with each other, as already described, and as a result of this, the shield member 40 is electrically connected to the motor housing 12 so as to be stably grounded.

Figure 6A:
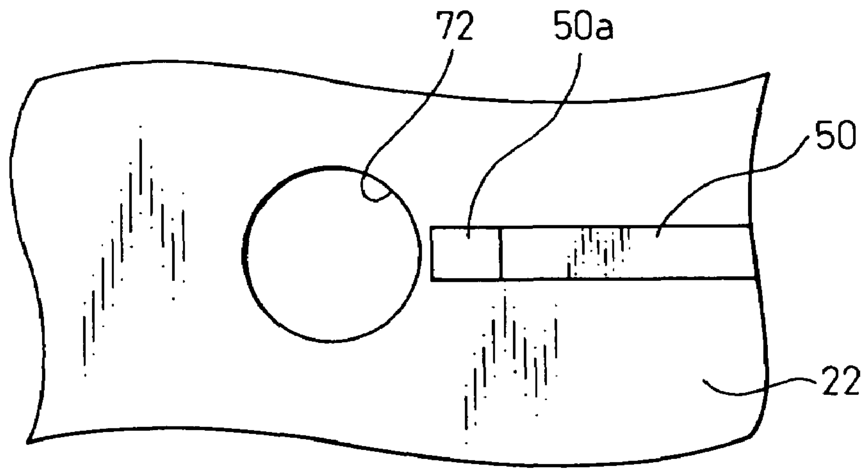
FIG. 6A is an enlarged plan view showing a second connecting structure of a grounding mechanism according to a further embodiment.
Figure 6B:
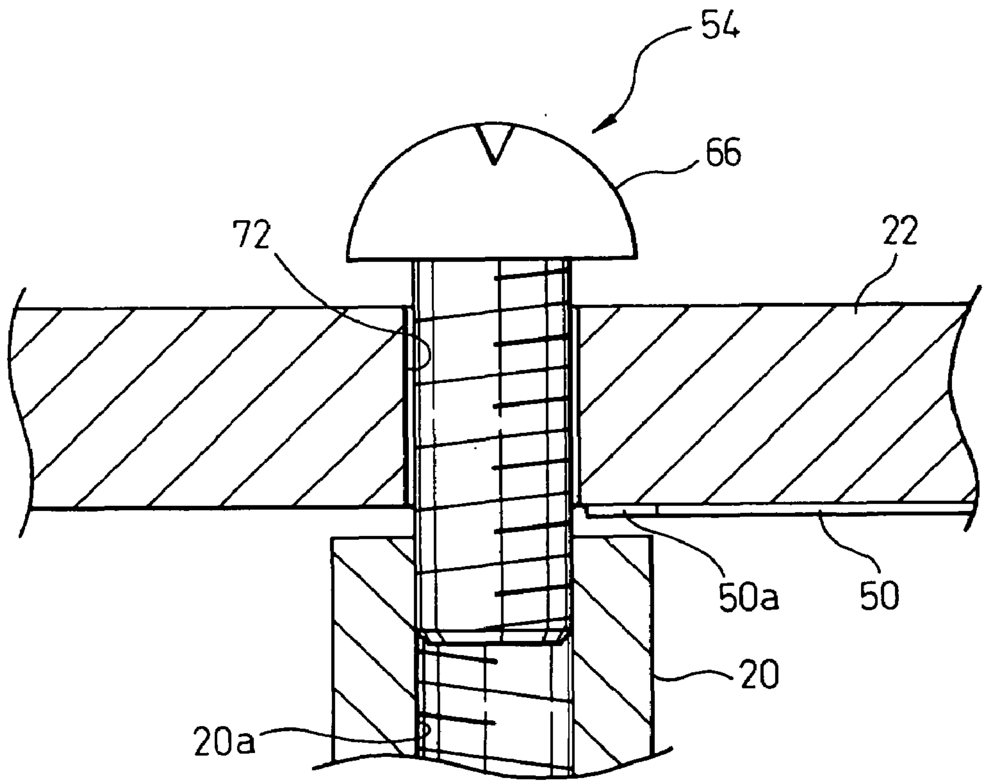
FIG. 6B is an enlarged sectional view showing the second connecting structure as shown in FIG. 6A.

Alternatively, as shown in FIGS. 6A and 6B, the second connecting structure 54 may include a fastening element 66 securing the circuit board 22 onto the frame member 20 in a condition where the conductor 50 is brought into conductive contact with the frame member 20. In this embodiment, a non-plating through hole 72 is formed in the circuit board 22 to penetrate between the opposite surfaces thereof, and the conductor 50 is patterned to extend from the first connector 58 (FIG. 3B) to the back surface of the circuit board 22 so that the distal end of the conductor is in close proximity to the periphery of the opening of the non-plating through hole 72. In this respect, the conductor 50 formed by a manufacturing technology for printed circuit board is generally coated by a resist, so that it is necessary to previously remove the resist on the desired length 50*a* of the distal end of the conductor.

Accordingly, when, for example, the fastening element 66 having an external thread 66*a* is inserted into the non-plating through hole 72 and is screwed into an internal thread 20*a* formed in the frame member 20, the circuit board 22 is secured to the frame member 20 and, simultaneously therewith, the conductor 50 on the back surface of the circuit board 22 comes into direct conductive contact with and is electrically connected to the frame member 20. Consequently, the shield member 40 of the output signal cable 42, connected to the conductor 50 via the first connecting structure 52, is electrically connected to the frame member 20 of the encoder 18, connected to the conductor 50 via the second connecting structure 54. In this respect, the frame member 20 is attached to the motor housing 12 in a condition as for them to be electrically conductive with each other, as already described, and as a result of this, the shield member 40 is electrically connected to the motor housing 12 so as to be stably grounded.

Figure 7A:
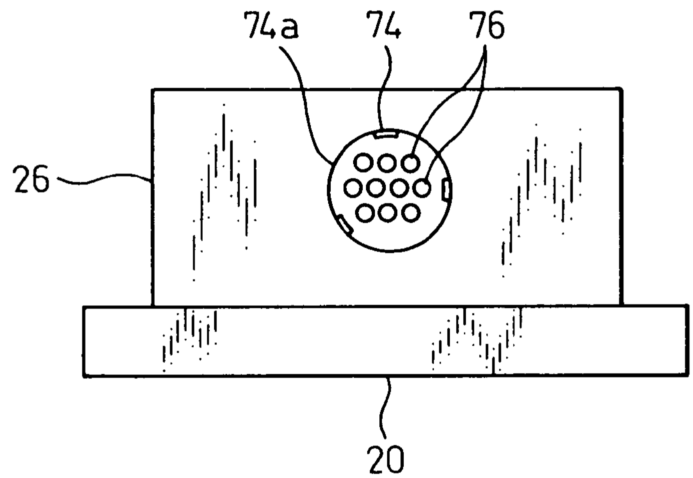
FIG. 7A is an enlarged front view showing a part of a first connecting structure of a grounding mechanism according to a yet further embodiment.
Figure 7B:
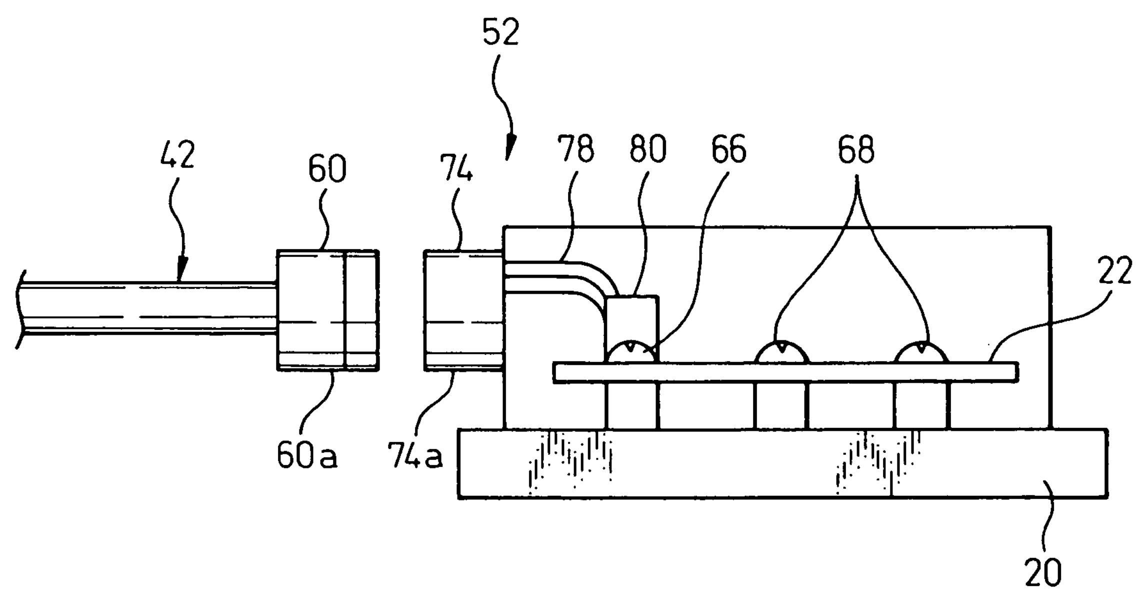
FIG. 7B is an illustration schematically showing in an entirety the first connecting structure as shown in FIG. 5A.
Figure 8A:
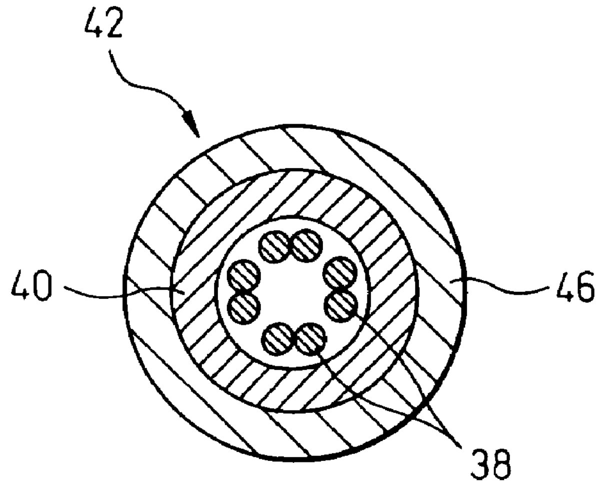
FIG. 8A is a cross-sectional view showing an output signal cable, by way of example, usable for the assembly of electric motor with encoder as shown in FIG. 1.
Figure 8B:
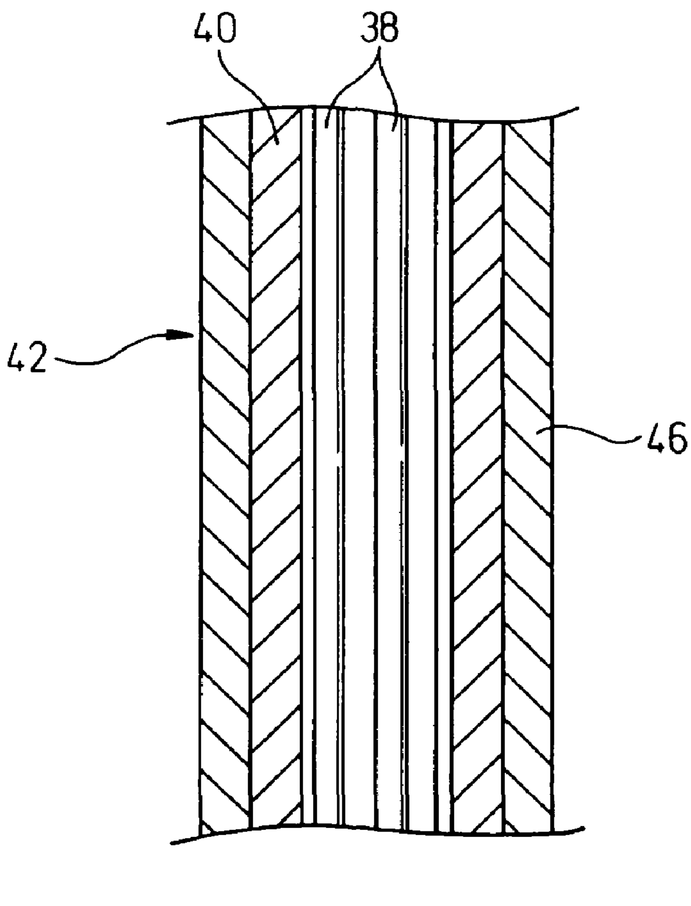
FIG. 8B is a vertical sectional view showing the output signal cable as shown in FIG. 8A.

Further, as the first connecting structure 52 mutually connecting the conductor 50 on the circuit board 22 with the shield member 40 of the output signal cable 42, a system other than the above-described embodiment may be adopted. For example, as shown in FIGS. 7A and 7B, as the first connector of the first connecting structure 52, an outer connector 74 attached to the encoder cover 26 enclosing the circuit board 22 may be adopted. The outer connector 74 is provided with a plurality of terminals 76 for output signals, and the terminals 76 are connected with the corresponding terminals (not shown) of a board connector 80 through an internal cable 78. One terminal (not shown) of the board connector 80 is connected to the conductor 50 (FIG. 3A) on the circuit board 22, whereby one terminal 76 of the outer connector 74 is electrically connected to the conductor 50. On the other hand, the second connector 60 connected to the output signal cable 42 is provided with a plurality of terminal holes (not shown) individually connectable to the terminals 76 of the outer connector 74, and one terminal hole is connected to the shield member 40 (FIG. 8A). When the outer connector 74 is properly coupled with the second connector 60, the terminal 76 of the former connector, connected to the conductor 50, is connected to the terminal hole of the latter connector, connected to the shield member 40. It will be appreciated that the combination of the first connecting structure 52 having this arrangement and the above-described conductor 50 and second connecting structure 54 also ensure the grounding (i.e., the potential common to the motor housing 12) of the shield member 40 of the output signal cable 42.

In the first connecting structure 52 having the above arrangement, another constitution may be adopted wherein conductive shells of the outer and second connectors 74, 60 are assigned to a grounding line, instead of the constitution wherein one terminal 76 of the outer connector 74 and one terminal of the second connector 60 are assigned to the grounding line. In this arrangement, the outer (or first) connector 74 includes a first conductive shell 74*a* made of a good electrically conductive material, such as a metal, and the first conductive shell 74*a* is connected through the internal cable 78 to the corresponding terminal of the board connector 80, which in turn is connected to the conductor 50 (FIG. 3A) on the circuit board 22. Thus, the first conductive shell 74*a* of the outer connector 74 is electrically connected to the conductor 50. On the other hand, the second connector 60 includes a second conductive shell 60*a* made of a good electrically conductive material, such as a metal, which is connected to the shield member 40 (FIG. 8A). When the outer connector 74 is properly coupled with the second connector 60, the first conductive shell 74*a* of the former connector, connected to the conductor 50, is conductively coupled with the second conductive shell 60*a* of the latter connector, connected to the shield member 40. It will be appreciated that the combination of the first connecting structure 52 having this arrangement and the above-described conductor 50 and second connecting structure 54 also ensure the grounding (i.e., the potential common to the motor housing 12) of the shield member 40 of the output signal cable 42.

While the invention has been shown and described particularly with reference to preferred embodiments thereof, it will be understood by those skilled in the art that various changes and modifications may be made without departing from the spirit and scope of the following claims.

What is claimed is:

1. An assembly of electric motor with encoder, comprising:
- a motor housing;
- an encoder including a frame member attached to said motor housing in a conductive manner, a circuit board supported on said frame member and a detection circuit provided in said circuit board;
- an output signal cable connected to said circuit board of said encoder and including a signal wire and a shield member; and
- a grounding mechanism electrically connecting said shield member of said output signal cable to said motor housing for grounding purposes;
- wherein said grounding mechanism includes a conductor provided to be patterned on said circuit board, a first connecting structure mutually connecting said conductor to said shield member, and a second connecting structure mutually connecting said conductor to said frame member.

2. An assembly of electric motor with encoder, as set forth in claim 1, wherein said first connecting structure comprises a first connector connected to said detection circuit and said conductor of said circuit board and a second connector connected to said signal wire and said shield member of said output signal cable, said first connector and said second connector being able to be coupled with each other.

3. An assembly of electric motor with encoder, as set forth in claim 2, wherein said first connector comprises a board connector mounted on said circuit board.

4. An assembly of electric motor with encoder, as set forth in claim 2, wherein said first connector includes a first conductive shell connected to said conductor, and wherein said second connector includes a second conductive shell connected to said shield member, said second conductive shell being able to be coupled with said first conductive shell.

5. An assembly of electric motor with encoder, as set forth in claim 4, wherein said first connector comprises an outer connector attached to an encoder cover enclosing said circuit board.

6. An assembly of electric motor with encoder, as set forth in claim 1, wherein said second connecting structure comprises a through-hole plating provided in said circuit board to be connected to said conductor, said through-hole plating coming into conductive contact with said frame member.

7. An assembly of electric motor with encoder, as set forth in claim 6, wherein said second connecting structure further comprises a fastening element inserted into a through hole having said through-hole plating and securing said circuit board onto said frame member.

8. An assembly of electric motor with encoder, as set forth in claim 1, wherein said second connecting structure comprises a land provided on said circuit board to be connected to said conductor and a connecting element electrically connecting said land to said frame member.

9. An assembly of electric motor with encoder, as set forth in claim 8, wherein said connecting element comprises a conductive fastening element securing said circuit board onto said frame member while coming into conductive contact with said land.

10. An assembly of electric motor with encoder, as set forth in claim 1, wherein said second connecting structure comprises a conductive fastening element securing said circuit board onto said frame member while conducting with said conductor.

11. An assembly of electric motor with encoder, as set forth in claim 1, wherein said second connecting structure comprises a fastening element securing said circuit board onto said frame member in a condition where said conductor is brought into conductive contact with said frame member.

* * * * *